3,753,940
METHOD FOR PREPARING VINYLIDENE CHLORIDE COPOLYMER LATEX COATING COMPOSITIONS
Alex Trofimow, Brookline, and Norbert K. Mader, Wilmington, Mass., assignors to W. R. Grace & Co., Cambridge, Mass.
No Drawing. Filed May 18, 1971, Ser. No. 144,641
Int. Cl. C08f 1/13
U.S. Cl. 260—29.6 RW    7 Claims

ABSTRACT OF THE DISCLOSURE

Vinylidene chloride copolymer latex coating compositions containing carboxylic acid comonomer and exhibiting improved adhesion qualities to difficultly-adherable substrates such as nylon, are prepared by regulating the addition of the acid comonomer to the polymerization zone.

---

This invention relates to vinylidene chloride copolymer coating compositions. More particularly, this invention relates to a method of preparing vinylidene chloride copolymer-containing coating compositions which exhibit improved adhesion to difficultly-adherable substrates.

Copolymers of vinylidene chloride and, for instance, alkyl acrylates and/or acrylic or methacrylic acid have been used to coat polymeric film and metallic foil substrates employed in packaging foodstuffs, etc., in order to improve the oxygen-impermeability of the substrate and its resistance to oils, greases and the like.

The adhesion of such vinylidene chloride copolymer coatings to certain substrates used in packaging such as nylon, however, is generally so poor that it is often necessary to modify the surface of the substrate or to provide a primer between the substrate and the vinylidene chloride copolymer coating in order to promote adhesion. This necessity imposes an additional step in the preparation of the packaging material and an additional expense.

A vinylidene chloride copolymer coating composition has been found which exhibits good adhesion to difficultly-adherable substrates such as nylon without the necessity of modifying the surface of the nylon or of employing an adhesion-promoting substance. The composition of the invention comprises an aqueous dispersion or latex of copolymeric particles wherein the overall composition of the copolymeric particles comprises from 85 to 93 weight percent of vinylidene chloride; from 5 to 10 weight percent of at least one comonomer of the group including acrylonitrile, alkyl acrylates, alkyl methacrylates, dialkyl fumarates and dialkyl maleates wherein the alkyl group contains about 1 to 3 carbon atoms; and from 2 to 7 weight percent of at least one carboxylic acid comonomer from the group which includes acrylic, methacrylic, itaconic, maleic and fumaric acid. It has been found that latexes of the foregoing copolymer particles exhibit superior adhesion to difficultly-adherable substrates when the addition of the monomeric constituents to the polymerization reaction zone is regulated so that the major amount, preferably at least 75 weight percent, of the total acid comonomer to be employed is introduced into the reaction zone after at least 50, preferably after at least 75 weight percent, of the total monomer to be added has been introduced into the zone and polymerization thereof substantially completed. One method of regulation in the foregoing manner comprises forming the total monomeric charge into two separate portions, one of the portions containing the bulk or major amount of acid comonomer to be employed. The portion containing the bulk of the acid is delivered to the polymerization zone after the remaining portion. The precise concentration of monomers in the two portions is pre-determined such that at least 50 weight percent of the total monomer to be employed has been delivered to the polymerization zone before the major portion of acid comonomer has been added.

With the exception of the regulated addition sequence of monomer the preparation of the aqueous dispersion or latex of copolymeric particles proceeds generally according to known aqueous emulsion polymerization techniques wherein the monomeric constituents are polymerized in the presence of a water-soluble, free-radical producing initiator or catalyst and an emulsifying agent capable of dispersing the monomeric material in the aqueous phase. Typical free-radical producing initiators include peroxides such as hydrogen peroxide, benzoyl peroxide and cumene hydroperoxide; persulfates such as potassium and sodium persulfate; and azo compounds such as azo-bis-isobutyronitrile. Redox free-radical initiating or catalyst systems such as combinations of the foregoing peroxygen or persulfate initiators with a reducing agent such as sodium sulfite, sodium bisulfite, ferric chloride, sucrose, ferrous gluconate, etc., are commonly employed in the art. The amount of the catalyst used may vary over a relatively wide range. Generally, about 0.1 to about 0.5 percent by weight of the free-radical producing initiator, based on the weight of the monomeric material to be polymerized is employed. Typical emulsifying agents include lauryl sulfate and sodium dodecyl benzene sulfonate. An amount of emulsifier which is at least sufficient to disperse the monomer in the aqueous phase is employed. The amount of emulsifier preferred in the process of the present invention generally ranges between about 1 and 3 percent by weight, based on the weight of monomeric material polymerized. The polymerization reaction is typically conducted at a temperature in the range of about 30 to 80, preferably 40 to 60° C.

In a preferred method of emulsion polymerizing the monomeric constituents according to the invention, a small amount of "seed" latex is introduced into the reaction zone initially to form micelles which act as sites for polymerization. Micelles can also be initially formed by introducing a small amount or "shot" of monomer to be polymerized at the start of the polymerization reaction. After formation of the proper number of micelles, monomer is added to the reaction zone in the aforementioned regulated sequence preferably with emulsifier and initiator being continuously added to the reaction zone over the period of polymerization. Preferably, at least some acid comonomer is included in the initial monomer portion added to act as a coupling agent to solubilize the aqueous emulsifier slurry in the monomer mix. Alternatively, a coupling agent such as methanol can be employed for the same purpose in place of the acid comonomer.

The following examples will further illustrate the invention and should not be considered in a limiting manner.

EXAMPLE I

The following is a detailed description of a conventional method of preparing a vinylidene chloride copolymer latex wherein the total monomer to be employed is added to the reaction zone as a homogeneous mixture.

0.27 part of sodium bisulfite is dissolved in 68.2 parts water and charged to flask. The flask is then heated to 104° F. An initial, minor amount of a monomer mixture containing 90 parts vinylidene chloride, 6.5 parts methyl acrylate and 3.5 methacrylic acid and 1.5 parts dodecylbenzene sodium sulfonate is added to the flask to form the proper number of micelles. The addition of 0.22 part of potassium persulfate to the flask is begun at a regular rate to deliver to the flask over the reaction period, about 5 hours. The remaining monomer mixture is then continuously added slowly and the temperature maintained at 104° F. The monomer polymerizes substantially instantaneously as it enters the reaction zone. After polymerization has terminated, the reaction mixture is cooled and the latex diluted to 45% solids and stripped to at least 60% solids.

EXAMPLE II

A latex is prepared as in Example I except that the remaining monomer mixture is added continuously in two separate portions, one portion preceding the other. The first portion contained 45 parts vinylidene chloride, 3.25 parts methyl acrylate and 0.25 part methacrylic acid. The second portion contained 45 parts vinylidene chloride, 3.25 parts methyl acrylate and 3.25 parts methacrylic acid.

EXAMPLE III

Several copolymeric latexes were prepared employing the methods of Examples I and II. The table below lists these latexes and the proportions of the monomeric constituents. Latexes A and B were prepared as in Example I, the entire monomeric mixture being added continuously as a homogeneous mixture. Latexes C through J were prepared as in Example II, the monomers being fed to the reactor in two portions, labelled I and II in the table, amount of the monomers in each portion being as shown. Latexes A and C-F had the same over-all copolymeric composition as did latexes B and G-J.

The adhesion to nylon of films made from latexes A-J by depositing the latexes on a nylon substrate was evaluated in the following manner:

Samples of nylon films are cut to about 6" x 7" and mounted on the clay coated side of a 16 pt. pressed paper board. Each substrate sample is carefully handled and placed in a special rack to prevent contamination of the surface to be coated. Latex is coated at 45% solids and without further alteration. A number three Meyer Rod is used to meter about 2.5 lbs./3000 ft.² coating onto the surface of each film. Approximately two seconds later the film is placed into an oven maintained at 100° C. dry bulk temperature and 50° C. wet bulk temperature (about 12% RH). After ten seconds drying time, the coated sample is allowed to cool to room temperature and stored under standard CT conditions for testing adhesion over a period of time. To test dry adhesion, a three inch long strip of #600 3M tape, 1-inch wide, is firmly pressed in place and is then removed with a rapid pull. The percent of coated material remaining on the coated sample surface is estimated from both the appearance of the film and of the tape after being pressed onto the backside of the board. Each piece of tape is pulled only once.

For wet adhesion, the coated samples are mounted over water in a closed container at 140° F. for 16-hours. The samples are removed and are allowed to cool for about 15 minutes and are then tested as above. The results are shown in the table.

It is claimed:

1. The method of preparing a vinylidene chloride polymer latex, which comprises introducing to a heated reaction vessel, in the presence of water, initiator and emulsifier from 85 to 93 percent by weight of vinylidene chloride; from 5 to 10 percent by weight of at least one comonomer selected from the group consisting of acrylonitrile, alkyl acrylates, alkyl methacrylates, dialkyl fumarates and dialkyl maleates wherein the alkyl group contains from 1 to about 3 carbon atoms; and from 2 to 7 percent by weight of at least one acid comonomer selected from the group consisting of acrylic, methacrylic, itaconic, maleic and fumaric acid; said acid comonomer being introduced in a manner such that at least 51 percent by weight of the total amount of said acid added is introduced to the reaction vessel after at least 50 percent by weight of the total amount of monomer to be added has been introduced to the vessel and become substantially polymerized.

2. The method of claim 1 wherein at least 75 percent by weight of said acid comoner is added after at least 50 percent by weight of the total amount of monomer has been introduced and become substantially polymerized.

3. The method of claim 1 wherein at least 51 percent of said acid comonomer is introduced after at least 75 percent of the total monomer has been added and become substantially polymerized.

4. The method of preparing an aqueous dispersion of a vinylidene chloride copolymer exhibiting improved adhesion to difficulty-adherable substrates, said copolymer having the overall monomeric composition of from 85 to 93 percent by weight of vinylidene chloride; from 5 to 10 percent by weight of at least one comonomer selected from the group consisting of acrylonitrile, alkyl acrylates, alkyl methacrylates, dialkyl fumarates and dialkyl maleates wherein the alkyl group contains from 1 to about 3 carbon atoms; and from 2 to 7 percent by weight of at least one acid comonomer selected from the group consisting of acrylic, methacrylic, itaconic, maleic and fumaric acid; said method comprising the steps of:
   (a) providing a reaction zone;
   (b) introducing water, emulsifier and an initiator for the reaction to said zone;
   (c) heating said zone to reaction temperature; and
   (d) introducing a monomeric charge predetermined to give the above overall copolymeric composition said introduction of said charge being conducted such that at least 51 percent by weight of said acid is delivered to said reaction zone after at least 50 percent by weight of the total amount of monomer to be added has been introduced to said reaction zone and become substantially polymerized.

5. The method of claim 4 wherein the monomeric charge is introduced continuously to said zone simultaneously with said initiator.

TABLE

| | A | B | C | | D | | E | | F | | G | | H | | I | | J | |
|---|---|---|---|---|---|---|---|---|---|---|---|---|---|---|---|---|---|---|
| | | | I | II | I | II | I | II | I | II | I | II | I | II | I | II | I | II |
| Vinylidene chloride | 89 | 90 | 61 | 28 | 44.5 | 44.5 | 44.5 | 44.5 | 44.5 | 44.5 | 45 | 45 | 45 | 45 | 69.6 | 20.4 | 68.25 | 21.75 |
| Methyl acrylate | 8 | 6.5 | 8 | | 3 | 5 | 2 | 6 | 1 | 7 | 3.25 | 3.25 | 3.25 | 3.25 | 5.0 | 1.5 | 6.50 | 0 |
| Methacrylic acid | 3 | 3.5 | 0.5 | 2.5 | 0.25 | 2.75 | 0.25 | 2.75 | 0.25 | 2.75 | 3.25 | 0.25 | 0.25 | 3.25 | 0.4 | 3.1 | 0.25 | 3.25 |
| Adhesion | Dry Wet | Dry Wet | Dry Wet | | Dry Wet | | Dry Wet | | Dry Wet | | Dry Wet | | Dry Wet | | Dry Wet | | Dry Wet | |
| Initial | 80 60 | 100 20 | 100 80 | | 60 20 | | 100 40 | | 0 0 | | 100 100 | | 80 100 | | 100 100 | | 100 100 | |
| One day | 60 66 | 100 20 | 100 40 | | 100 0 | | 40 40 | | 0 0 | | 100 0 | | 100 100 | | 100 100 | | 100 100 | |
| One week | 40 0 | 100 0 | 100 40 | | 100 40 | | 100 60 | | | | 100 0 | | 100 100 | | 100 100 | | 100 100 | |
| Two weeks | 0 0 | 100 0 | 80 100 | | 100 80 | | 100 40 | | 0 20 | | 100 80 | | 100 100 | | 100 100 | | 100 100 | |
| Four weeks | 100 0 | 100 0 | 100 100 | | 100 40 | | 100 80 | | 60 60 | | 100 80 | | 100 100 | | 100 100 | | 100 100 | |

The results of the adhesion tests shown in the table evidence the improved adhesive properties obtained using the method of the invention. Moreover, the test results indicate that best adhesion occurs when all of the acrylate comonomer is included in the first portion.

6. The method of claim 4 wherein said copolymer contains vinylidene chloride, methyl acrylate and methacrylic acid in the said proportions.

7. The method of claim 1 wherein the non-acid monomer other than the vinylidene chloride is added at such a rate that at least 50% of the total quantity of said monomer used is added to the reaction mixture before 50% of the total monomer has been added.

References Cited

UNITED STATES PATENTS

| | | | |
|---|---|---|---|
| 2,909,449 | 10/1959 | Banigan | 260—29.6 TA |
| 3,309,330 | 3/1967 | Settlage | 260—29.6 TA |
| 3,328,330 | 6/1967 | Trofimow et al. | 260—29.6 TA |
| 3,424,706 | 1/1969 | Smith et al. | 260—29.6 TA |

WILLIAM H. SHORT, Primary Examiner

L. M. PHYNES, Assistant Examiner

U.S. Cl. X.R.

260—29.6 TA, 884, 885